United States Patent [19]
Chanda et al.

[11] Patent Number: 5,550,909
[45] Date of Patent: Aug. 27, 1996

[54] INTERNATIONAL TOLL-FREE CALLING PROCESS

[75] Inventors: Rajat Chanda, Howell; Hani M. Dib, Montville; Steven T. Heinsius, Freehold, all of N.J.

[73] Assignee: AT & T Corp., Murray Hill, N.J.

[21] Appl. No.: 323,303

[22] Filed: Oct. 14, 1994

[51] Int. Cl.⁶ .................................................... H04M 3/42
[52] U.S. Cl. ........................ 379/220; 379/201; 379/120; 379/127; 379/112
[58] Field of Search .................................... 379/201, 220, 379/221, 200, 112, 111, 120, 142, 207, 246, 127

[56] References Cited

U.S. PATENT DOCUMENTS

| | | | |
|---|---|---|---|
| 4,594,477 | 6/1986 | Noirot | 379/221 |
| 4,727,577 | 2/1988 | Frey et al. | 379/112 |
| 5,003,584 | 3/1991 | Benyacar et al. | 379/201 |
| 5,185,785 | 2/1993 | Funk et al. | 379/111 |
| 5,333,185 | 7/1994 | Burke et al. | 379/112 |

*Primary Examiner*—Ahmad F. Matar

[57] ABSTRACT

A telecommunications method is disclosed for processing calling party information so that an "800" or toll-free telephone number or a value-added service telephone number made up of a special service code followed by 7 digits indicating an ultimate destination for the call can be directly provided by a foreign telecommunication administration and processed by a domestic telecommunication administration without the need for the originating foreign telecommunication administration to pass a country identifier or other carrier specific information as part of the dialed number. Additionally, the method provides for a blocking condition which allows calls from certain foreign locations to the dialed number to be blocked.

10 Claims, 4 Drawing Sheets

INTERNATIONAL TOLL-FREE CALLING PROCESS

TECHNICAL FIELD

This invention relates to a telecommunications method for handling a directly dialed international call, and more particularly, to a method which allows processing an international call to a toll-free or a value-added service telephone number without the need for the originating telecommunication adminstration providing origination information as part of the dialed number.

BACKGROUND OF THE INVENTION

The present invention relates to international telecommunications systems and particularly to toll-free or "800" telecommunications networks, but which may be applied in a straightforward manner to other value-added service telephone number.

For purposes of telephone communications, a geopolitical area, such as the United States, is divided into a plurality of contiguous, non-overlapping districts, called exchanges, each of which is usually served by a local telephone company. Telephone calls originating and terminating within the same exchange, referred to as intraexchange calls, are generally handled end-to-end by a local, intraexchange, telephone company. Calls originating within one exchange, for example, in a foreign country and terminating in a different foreign country, such as the United States, referred to as interexchange calls, are generally handled at each end by the Telecommunication Administration that services the respective originating and terminating exchange.

As used herein, a "domestic" location refers to a location within the North American Numbering plan (NANP) but excluding the international Carribean and Mexico, in World Zone 1 as described in CCITT Blue Book, Vol. 2 FASCICLE II-2, Telephone Network and ISDN—Operation, Numbering, Routing and Mobile Service Recommendations E.100–E.333, at E.164 (1989) incorporated herein by reference. A "non-domestic", "foreign" or "overseas" location refers to a call originating from a location outside World Zone 1, as described in the reference above, from Mexico (which utilizes the NANP), or from the Carribean (which, although part of World Zone 1, has the attendant drawbacks of other non-domestic locations).

Callers located in the United States generally have the ability to dial certain special numbers, for example, "800" followed by 7 digits (800+7D) to call a sponsor or subscriber to an "800" service at no charge to the caller, or "900", "700" and "500" followed by 7 or more digits to access a "value-added" sponsor provided service. Additionally, the sponsors or subscribers to these services have many other features, such as receiving call origination information often called calling line indentification (CLI), or call blocking, available to them. CLI enables the sponsor or subscriber seeking additional features to obtain valuable marketing information such as: the times and dates of the calls, the origination point of the calls, the duration of the calls, etc. As a result, "800" calls are valuable marketing tools because the entire call (i.e. end-to-end) is paid for by the subscriber, the subscriber can market the number in the national media, and the subscriber can, to some extent, restrict access to its 800 number to preselected geographic regions.

Unfortunately, the domestic 800 number subscriber does not have the same abilities with respect to non-domestic originating calls. This problem arises because each non-domestic telecommunication administration has its own numbering plan which may or may not be able to accommodate direct dialing of an 800+7D domestic number. Therefore, it is currently impossible for domestic 800 service subscribers to market their 800+7D domestic number non-domestically.

Furthermore, where non-domestic telecommunication administrations have the ability to accommodate direct dialing of an 800+7D domestic number, they can not pass originating country information to the domestic telecommunication administration as part of the 800+7D domestic number. Thus, there is no way for the subscriber to know the originating location and therefore block or deny access to the non-domestic call.

Currently, calls from non-domestic callers to domestic toll-free numbers come into the domestic telecommunication administration, illustratively the AT&T Switched Network (ASN) as a network routing number (NRN) in the format 196-WXY-CCVZ or 196-WXY-VCCZ. The CC identifies the originating telecommunication administration and the WXYVZ is a subscriber identification number. Since the value of CC must be in the range of 10 to 99, the system can only accommodate 89 unique telecommunication administrations. Furthermore, certain of the 5 digits WXYVZ are restricted to a range of values less than 0 through 9 resulting in only approximately 16,900 possible subscriber identities. The number of telecommunication administrations is fast approaching the limit as are number of subscribers desireous of such services.

Thus, a need exists in the art for a new process for receiving a wider range of calls from non-domestic telecommunication administration is required which will enable the non-domestic telecommunication administration to pass toll-free telephone numbers to the domestic telecommunication administration in either the Foreign Subscriber Identifying Format of 196-TUW-XYVZ (where T,U,W,X,Y,V, Z=0–9), from locations where direct dialing of 800+7D is not possible, or directly in the preferable 800+7D format without the need for the non-domestic telecommunication administration to also send embedded country and carrier identifying coding as part of the number.

SUMMARY OF THE INVENTION

In accordance with the invention, we have realized a method whereby a non-domestic telecommunication administration can pass toll-free telephone numbers to a domestic telecommunication administration in either the Foreign Subscriber Identifying Format of 196-TUW-XYVZ (where T,U, W,X,Y,V,Z=0–9), from locations where direct dialing of 800+7D is not possible, or directly in the preferable 800+7D format without the need for the non-domestic telecommunication administration to also send embedded country and carrier identifying coding as part of the number.

In accordance with a feature of the invention, we have realized a method whereby non-domestic caller information may be made available to a domestic service subscriber or sponsor.

In accordance with a further feature of the invention, we have realized a method whereby the subscriber or sponsor can specify that calls originating from a particular non-domestic telecommunication administration, type of location or specific area be blocked from access to the domestic toll-free or value-added service.

Other features will become apparent from the following detailed description considered in conjunction with the accompanying drawings. It is to be understood, however, that the drawings are intended solely for purposes of illustration and not as a definition of the limits of the invention, for which reference should be made to the appended claims.

DETAILED DESCRIPTION

Figure 1:
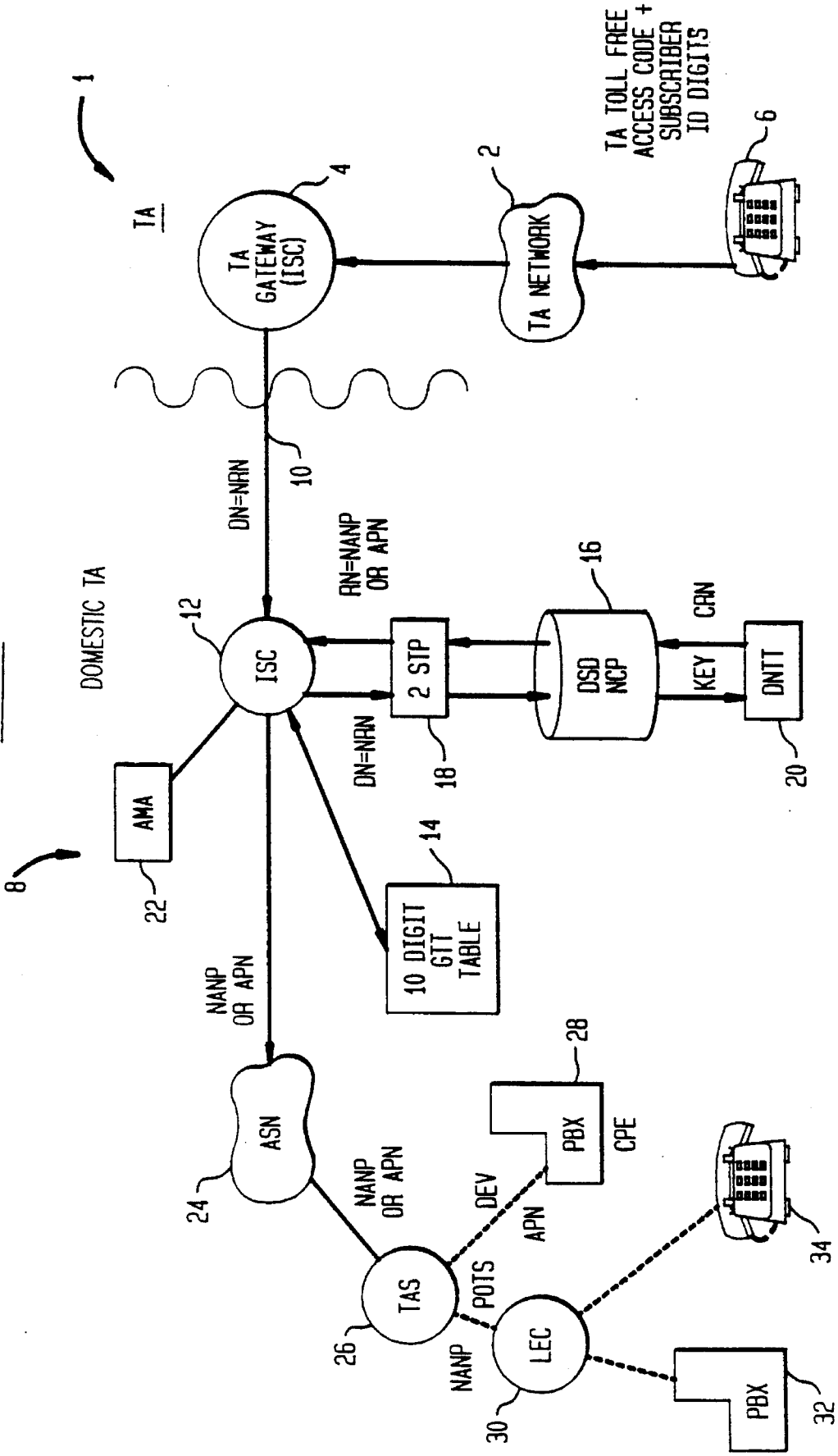
FIG. 1 shows a simplified communication system for processing calls.

Referring to FIG. 1 which shows, in simplified form, a representative communication system for processing calls from a non-domestic location to a domestic toll-free or value-added service according to a prior art method.

Throughout the world geopolitical areas are served by networks, comprising, for example, the United States or other countries. The telecommunication needs of each geopolitical area is served by at least one telecommunication administration network which processes calls within that geopolitical area. By way of example, a non-domestic telecommunication administration (TA) 1 includes a telecommunication administration network 2 and a telecommunication administration gateway. Telephone equipment 6, for example, a telephone in a person's house or office or a pay telephone, is connected to the telecommunication administration network 2 and used by a caller to initiate the process. The caller dials a domestic service number (e.g. 800+7 digits, 900+7 digits, 500+7 digits, etc.) or where the local TA 1 can not process the 800+7 digits, etc. format, a local toll-free number or access code which is used to identify the particular service desired, which preferrably is a toll-free service access code, followed by a series of digits identifying the domestic subscriber or sponsor which will be converted by the TA 1 to a number of the format 196+7 digits.

As used herein, the terms sponsor and subscriber are used interchangeably for the entity associated with a unique domestic toll-free or value-added service telephone number. For simplicity, the invention is specifically discussed herein with reference to the preferred service of toll-free call processing, however it will be recognized that principles discussed herein may be applied to the processing of non-domestic calls to other services, for example, value-added services, in a straightforward manner.

Returning to FIG. 1, the call is recognized as outgoing international call by the telecommunication administration network 2 which routes the call to a non-domestic gateway switch 4 also known as an international switching center (ISC). The non-domestic gateway switch 4 identifies the carrier to which the call will be routed and converts the dialed number to a Network Routing Number (NRN). By way of example, the process is further described using a call to a domestic 800 service telephone number and using a domestic AT&T telecommunication network 8. It will however, be apparent that the teachings herein may be implemented in other telecommunication networks by those skilled in the art in a straightforward manner.

For the AT&T network, the NRN is of the form 196-WXY-CCVZ or 196-WXY-VCCZ, where the "196" is a special services code (SSC) indicating I800 service, WXYVZ identifies the subscriber and CC is a pseudo country code which identifies the country or carrier of origin or, for Mexico, the service area of the origination point. The CC digits are in the range of 10 to 99.

The call is then routed by the non-domestic gateway switch 4 over any available international trunk 10 to an AT&T ISC 12, which may illustratively be an electronic program-controlled telephone system of the No. 4ESS® (electronic switching system) design as described in the series of articles in the Bell System Technical Journal (BSTJ), Sept., 1977, Volume 56, No. 7 at pages 1017 et seq., and references cited therein, incorporated herein by reference.

Alternatively, the call may be routed over a CCS7 ISUP trunk to an AT&T ISC 12, thereby allowing the non-domestic gateway 4 switch to provide the AT&T ISC 12 with additional call related signaling information, for example, identifying the specific originating or calling number also known as CLI. The AT&T ISC 12 functions as an originating AT&T switch (OAS) for the call. The AT&T ISC 12 looks at the seventh digit of the NRN to determine which of the two formats was received. The AT&T ISC 12 determines where the pseudo country code is and creates a Global Title Record Key of the form 196-00WXYVZ. The global Title Record Key is used to perform a 10 Digit Global Title Translation (10D GTT) using a 10D GTT table 14. If a match is found, the ISC 12 determines which Direct Services Dialing Network Control Point (DSD NCP) pair 16 should receive a query using information from the 10D GTT table 14. If a match is not found, the ISC 12 will default to 6 digit GTT using, for example, a No. 2 Signal Transfer Point (2STP), not shown, to route the query to the correct DSD NCP pair.

Once the correct DSD NCP 16 is determined, the ISC 12 queries the DSD NCP 16. The query includes the NRN (in the 196-format), which is passed in the dialed number (DN) parameter and any available CLI information, which is passed as part of the Automatic Number Identification (ANI) parameters. The query is routed through a No. 2 Signal Transfer Point (2STP) 18 in the Common Channel Signaling (CCS) network (not shown) to the appropriate DSD NCP Pair 16.

The DSD NCP 16 that receives the query extracts the pseudo country code digits from the NRN, which digits are used for country code routing and blocking. The DSD NCP 16 sets a parameter to reflect the country code and sets the ANI parameter to either the CLI (if available) or to a code reflecting only the country code. The DSD NCP 16 then converts the NRN to a Dialed Number Translation Table (DNTT) key. The converted key is translated into the form 196-00WXYVZ. The DSD NCP 16 continues processing the call by searching a DNTT 20 for a match with the key.

If a match is found, a call processing record associated with a customer account ID is executed. If no match is found, a default condition is indicated and processed.

Where a match is found and a call processing record associated with a customer account ID is executed, the DSD NCP 16 can process the call so as to include announcements or call prompter interactions.

The DSD NCP 16 then initiates continued routing of the call by signaling automatic message accounting (AMA)

equipment 22 associated with the ISC 12 to create an AMA record. The connection operation indicates to the ISC/OAS 12 that it should route the call using as a routing number either an Action Point Number (APN) or a POTS number (NANP). The call is then routed via an AT&T switched network 24 to a terminating switch (TAS) 26, illustratively of the 4ESS® design. The TAS then routes the call to its ultimate destination, for example, to Customer Premises Equipment (CPE), for example, a PBX 28 or, for switched egress subscribers, to a local exchange carrier (LEC) 30 to complete the call routing, for example, to a PBX 32 or POTS telephone 34.

In those cases where an out-of-band CCITT7 signaling connection is available call origination information is obtained from the Initial Address Message (IAM). Thus, if CLI information is available at the ISC 12, for example, over a CCITT7 ISUP, the ISC will obtain the CLI information from the IAM and pass it for optional delivery to the subscriber. Where CLI is provided to the subscriber, the TAS signals the ISC to bill the subscriber for CLI delivery.

If the CPE 28 answers the call, the CPE 28 signals the originating ISC 12 for call supervision to cause the creation of a billing AMA record by the AMA equipment 22. The ISC 12 then begins calculating elapsed time until the call is terminated. Upon call termination, the ISC 12 provides completion information to the AMA equipment 22.

Figure 2:
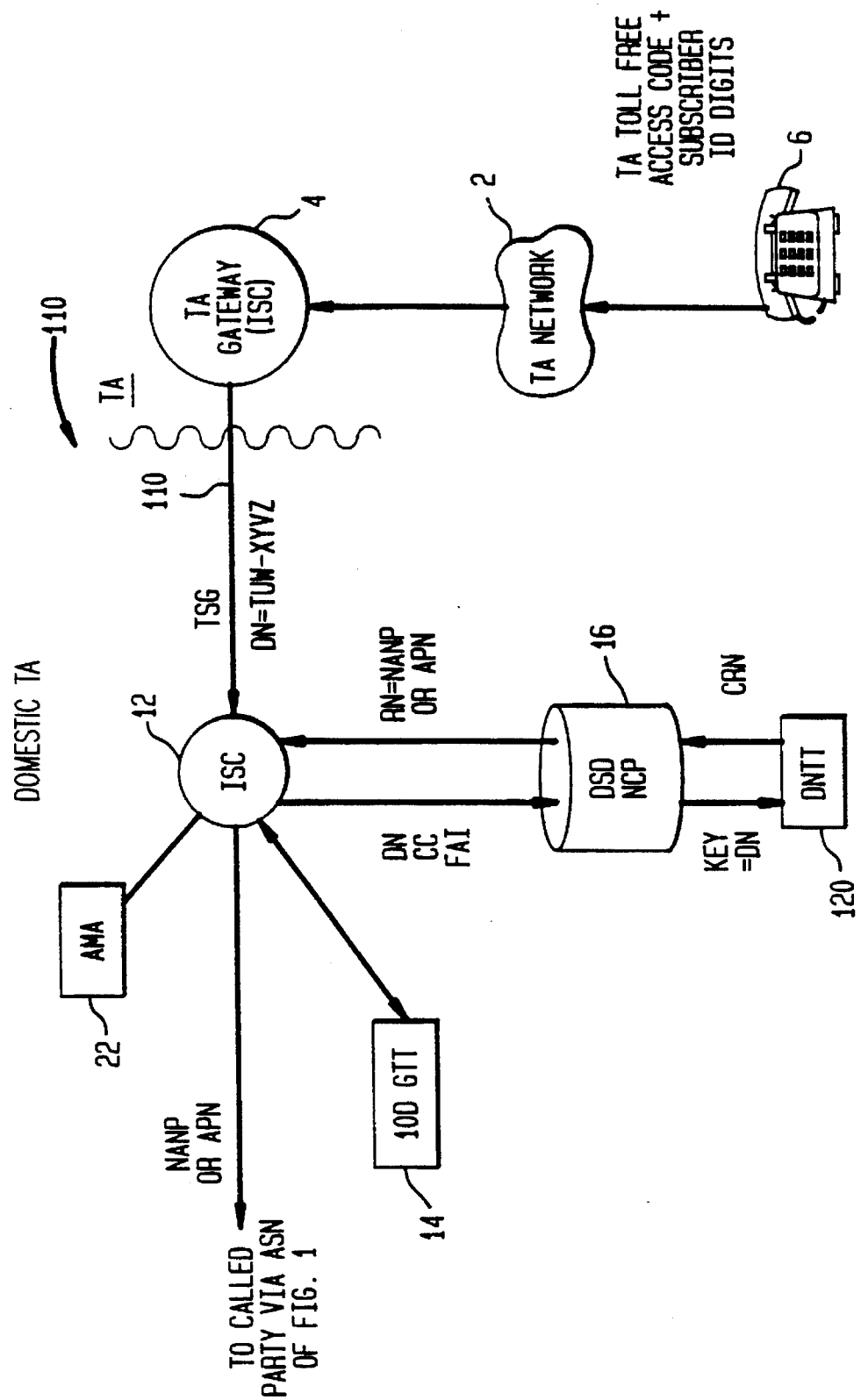
FIG. 2 shows a portion of the simplified communication system of FIG. 1 used for processing calls in accord with the invention for calls in the 196-TUW-XYVZ.

Referring now to FIG. 2, which shows a portion of the network of FIG. 1, a call is initiated and routed to an ISC 12 as with FIG. 1, except the call is now received by the ISC 12 in the format 196-TUW-XYVZ without embedded call origination information. The number may be dialed directly in that format or in the local toll-free numbering format which the foreign TA 1 must translate to the above format. Accordingly, the ISC 12 processing logic is greatly simplified because it does not have to perform any number manipulation or extraction of country code information from the number. The number received from the TA 1 is useable as received.

Since a large majority of countries have in-band Multi Frequency (MF) signalling connections with domestic networks, call origination information, including the country code, is obtained using those MF signalling connections. The ISC 12 receives the call over international trunk lines divided up into one of a plurality of international trunk sub-groups (TSG). For purposes of clarity, only one TSG 110 is shown. The call origination information is therefore obtained from the TSG 110. Each TSG 110 has processing equipment associated with it so as to be capable of identifying the origination country, carrier of origin or, for Mexico, the service area of the origination point. This information is obtained by the ISC 12 as TSG characteristics. The TSG characteristics are used to populate a field in the ANI in the format CCC-NXX, where CCC is the actual International Direct Distance Dialing IDDD country code and NXX is the origination point identifier also known as the end office indicator. The CCC-NXX is used for call settlement purposes between the non-domestic TA 1 and the domestic service provider. Similarly, the originating carrier or Foreign Adminstration Identifier (FAI) is identified from the TSG characteristics. The TSG characteristics available to the ISC 12 and the interaction between the ISC 12 and TSG 110 is extensively described and discussed in the AT&T Technologies, Inc. publication entitled "Translation Guide—4ESS® Switch—TG4", Jan. 1990, which may be ordered from AT&T by calling (800) 432-6600. Where a CCS7 trunk is used, additional information including, for example, the originating number or CLI may be provided to the ISC 12 by the IAM signaling message. The ISC 12 performs a 10D GTT 14 on the number to select the appropriate DSD NCP pair 16.

The DSD NCP pair 16 receives the call from the ISC 12 and, since the number is in the 800+7D (or 196+7D) format, the manipulations are greatly simplified.

The DSD NCP pair 16 is no longer required to determine where the pseudo country code digits are and need not reformat the number. Additionally, having obtained the actual IDDD country code (CCC) and originating carrier identification (FAI) from the TSG 110, all 7 digits of the phone number may be used for customer identification. Furthermore, no conversion of NRN to a Dialed Number Translation Table (DNTT) key is required. The DSD NCP 16 can now obtain the specific routing information from the DNTT 120 using the "+7D" as the DNTT key. The DSD NCP 16 then initiates continued routing of the call, as described in connection with FIG. 1, at the point of signaling automatic message accounting (AMA) equipment 22 associated with the ISC 12 to create an AMA record.

Figure 3:
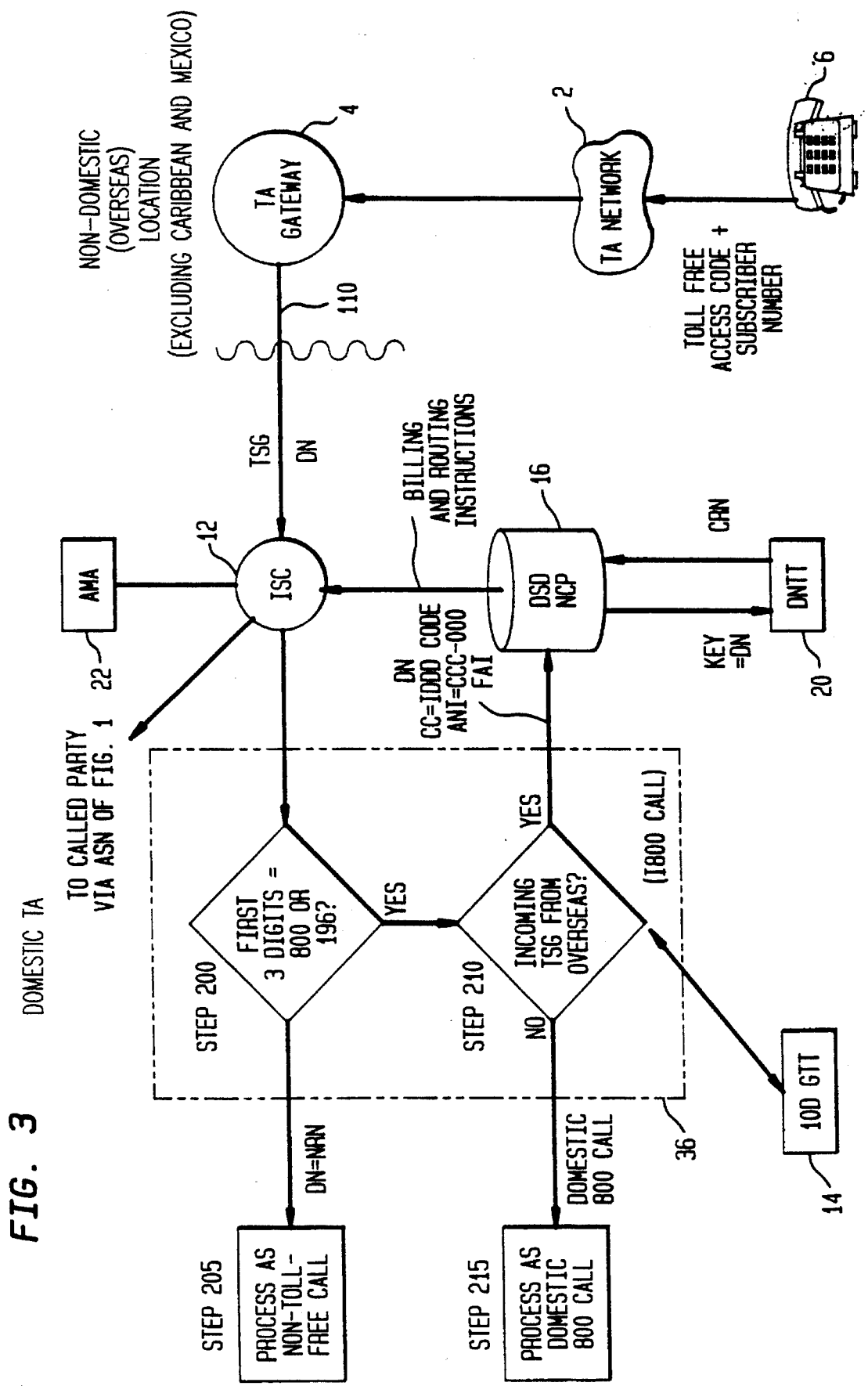
FIG. 3 shows, in simplified partial form, the inventive method for processing calls from non-domestic locations exclusive of the international Caribbean and Mexico.

FIG. 3 shows a portion of the network of FIG. 2 with the processing flow undertaken in the ISC 12 illustrated 36. As noted above, the call arrives at the ISC 12 as a dialed number (DN). The ISC 12 checks the first 3 digits of the call for an 800 or 196 (step 200). If the dialed number is not 800+7D or 196+7D (e.g. the first 3 digits are not 800 or 196), the call processing continues as a non-toll-free call in a known manner (step 205). If the dialed number is 800+7D or 196+7D, the ISC 12 picks up the TSG characteristics from the TSG 10. The ISC 12 checks the TSG characteristics to see if the call is domestic (step 210). If the call is domestic, the call is processed further as a domestic toll-free call in a known manner (step 215). If the TSG characteristic indicates that the call is from a non-domestic location, the TSG characteristics indicating the originating carrier, origination point and 7D of the number are processed as described in connection with FIG. 2, with the ANI populated as CCC-000 (i.e. end office indicator set to a null value).

Figure 4:
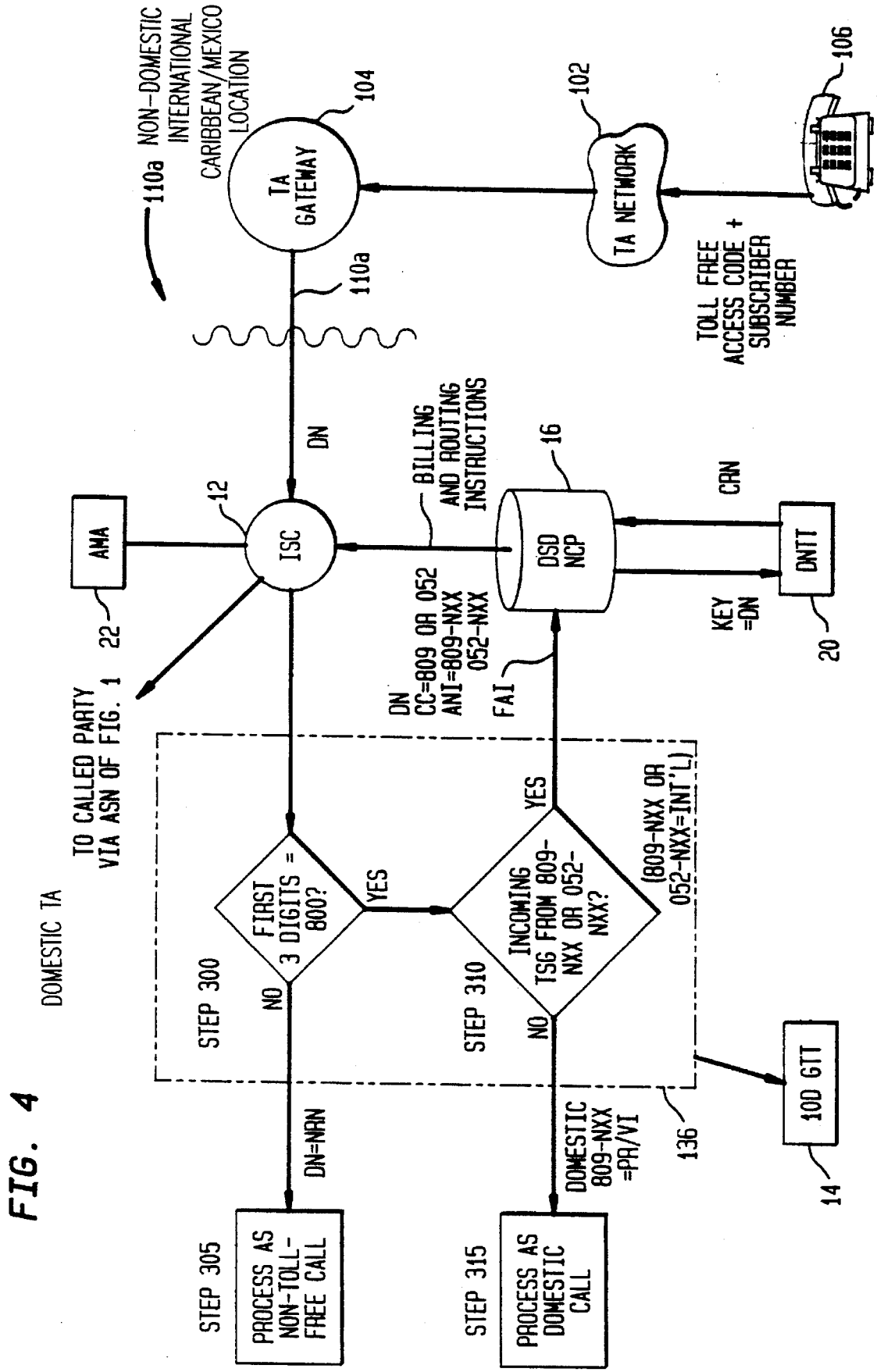
FIG. 4 shows, in simplified partial form, the inventive method for processing calls from the Caribbean.

FIG. 4 shows a portion of the network of FIG. 2 with the processing flow undertaken in the ISC 12 for locations in the international Carribean or Mexico 136. These locations must be treated differently because the Carribean has seventeen islands all identifid by the IDDD country code 809. Similarly, Mexico has an IDDD country code of 052 but is broken up into several service areas. As in FIG. 3, the first three digits are checked (step 300). If the digits are not "800" the call is processed as a non-toll free call (step 305). If the first three digits are "800", then the TSG 110a is checked for a country code of 809 or 052 (step 310). If the country code is 809 and the call is domestic 809 (i.e. Puerto Rico/U.S. Virgin Islands (PR/VI)) the call is processed as a domestic call (step 315). If the call is from international 809 or 052 the call processing continues as with FIG. 3. However, where in FIG. 3 the ANI is populated as CCC-000 (i.e. end office indicator set to a null value), in FIG. 4 the ANI is populated as CCC-NXX (i.e. end office indicator is now set to indicate the origination point. Thus, for the Carribean and Mexico, the ANI must be populated with the IDDD country code and also the end office indicator for those locations. Thus, if the IDDD country code is 809 (Carribean) or 052 (Mexico), the NXX will be populated with the end office indicator rather than a null value. Once this is done, the processing continues as described above.

Thus, while there have been shown and described and pointed out fundamental novel features of the invention as applied to a preferred embodiment thereof, it will be understood that various omissions and substitutions and changes in the form and details of the disclosed system, and in its operation, may be made by those skilled in the art without departing from the spirit of the invention. It is the intention, therefore, to be limited only as indicated by the scope of the claims appended hereto.

What is claimed is:

1. A method for processing international calls comprising the steps of:

receiving a call, at a switch located in a domestic telecommunications network, made by a caller in a foreign location by directly dialing a domestic telephone number assigned to a sponsor of said domestic telephone number, said domestic telephone number including a special service code followed by 7 digits, all of said 7 digits being used to identify said sponsor as an ultimate destination for said call, said call having been carried over an international trunk sub-group along with call origination information and said domestic telephone number;

determining at said switch that said call originated from said foreign location and is an international call;

identifying from said international trunk sub-group trunk sub-group characteristics including a country identifier and originating carrier specific information for the call;

utilizing said country identifier and carrier specific information as ANI parameters; and processing said call to said ultimate destination using all of said 7 digits of said domestic telephone number, said country identifier and said carrier specific information.

2. The method of claim 1, wherein said processing step includes the steps of obtaining routing information indicating said ultimate destination utilizing all of said 7 digits of said domestic telephone number; and billing said sponsor for said call.

3. The method of claim 1, wherein said step of identifying trunk sub-group characteristics from said international trunk sub-group which carried said call further includes the step of identifying calling line identification information.

4. The method of claim 3, further including the step of providing said calling line identification information to said sponsor.

5. A method for processing international calls comprising the steps of:

receiving a call made by a caller in a foreign location by directly dialing a domestic toll-free number assigned to a subscriber to a toll-free service, said domestic toll-free number including a special service code followed by 7 digits, all of said 7 digits being used to identify an ultimate destination for said call and said call having been carried over an international trunk sub-group, at a switch located in a domestic telecommunications network;

determining at said switch that said call originated from said foreign location and is a toll-free call;

identifying from said international trunk sub-group trunk sub-group characteristics including a country identifier and originating carrier specific information for said toll-free call;

utilizing said country identifier and carrier specific information as ANI parameters;

processing said call to said ultimate destination using all of said 7 digits; and providing said country identifier and said carrier specific information to said subscriber.

6. The method of claim 5, wherein said processing step includes the steps of billing said subscriber for said call.

7. The method of claim 5, further including the step of extracting from said trunk sub-group characteristics a numbering plan area code.

8. A method for processing international calls comprising the steps of:

receiving a call at a switch located in a domestic telecommunications network, said call having been made by a caller in a foreign location to a domestic telephone number assigned to a sponsor of said domestic telephone number, said domestic telephone number including a special service code followed by 7 digits all of said 7 digits being used to identify an ultimate destination for said call, said call having been carried over an international trunk sub-group along with call origination information and said domestic telephone number;

identifying from said international trunk sub-group trunk sub-group characteristics including a country identifier and originating carrier specific information for the call;

utilizing said country identifier and carrier specific information as ANI parameters;

determining that said call originated from said foreign location and, using said ANI parameters, whether a blocking condition exists for said call and, if so, terminating said call, otherwise, processing said call to said ultimate destination using all of said 7 digits of said domestic telephone number, said country identifier and said carrier specific information.

9. The method of claim 8 wherein said step of processing said call to said ultimate destination further includes the step of creating an AMA record for said call.

10. The method of claim 9 further including the step of billing said sponsor of said domestic telephone number for said call.

* * * * *